(12) United States Patent
Chambers et al.

(10) Patent No.: US 7,541,008 B2
(45) Date of Patent: Jun. 2, 2009

(54) FLUID REACTOR

(75) Inventors: Richard Dickinson Chambers, Durham (GB); Darren Holling, Durham (GB); Graham Sandford, Durham (GB)

(73) Assignee: University of Durham of University Office (GB)

( * ) Notice: Subject to any disclaimer, the term of this patent is extended or adjusted under 35 U.S.C. 154(b) by 311 days.

(21) Appl. No.: 10/513,546

(22) PCT Filed: May 9, 2003

(86) PCT No.: PCT/GB03/01993

§ 371 (c)(1),
(2), (4) Date: Nov. 4, 2004

(87) PCT Pub. No.: WO03/095086

PCT Pub. Date: Nov. 20, 2003

(65) Prior Publication Data
US 2005/0214184 A1    Sep. 29, 2005

(30) Foreign Application Priority Data
May 11, 2002 (GB) ................... 0210809.0

(51) Int. Cl.
B01J 10/00 (2006.01)
(52) U.S. Cl. ...................... 422/191; 422/193
(58) Field of Classification Search ............ 422/187, 422/188, 191, 193, 196, 197
See application file for complete search history.

(56) References Cited
U.S. PATENT DOCUMENTS
5,989,402 A 11/1999 Bousse et al.

7,101,514 B2 * 9/2006 Huang et al. .............. 422/187

FOREIGN PATENT DOCUMENTS
EP    1 283 071 A    2/2003
EP    1 295 634 A    3/2003

OTHER PUBLICATIONS
R.D. Chambers and R.C.H. Spink, Microreactors for Elemental Fluorine, 10 Chem. Commun. 883-884 (1999).*
W. Ehrfeld et al., Characterization of Mixing in Micromixers by a Test Reaction: Single Mixing Units and Mixer Arrays, 38 Ind. Eng. Chem. Res. 1075-1082 (1999).*

(Continued)

Primary Examiner—Glenn Caldarola
Assistant Examiner—Randy Boyer
(74) Attorney, Agent, or Firm—Townsend and Townsend and Crew LLP

(57) ABSTRACT

A reactor for carrying out a reaction between at least two fluids comprises a reactor plate (20) with a plurality of grooves or through slots (22) in which the fluids mix and react and a separable overlying reservoir plate (2) for supplying the fluids to slots (22) from reservoirs (4, 6) via slots (10) a, (10) b, with a collecting conduit or reservoir (8) and slots (10) c for the product of the reaction. Reservoir plate (2) may lie between two reactor plates, or a single reactor plate (20) may lie between two reservoir plates. Third or further reservoirs may or may not be spaced from the second reservoir (6) depending on whether more than two fluids need to be present simultaneously, or whether a second reaction is required after the first two fluids have had time to react. Means may be provided for controlling the pressure in slots (22), the pressure differential (and flow rate) along slot (22), and/or the temperature in the reservoirs (4, 6) or slots (22). Multiple reactors may be coupled in parallel/series for scaling up or for performing plural or progressive reactions (such as perfluorination).

31 Claims, 10 Drawing Sheets

OTHER PUBLICATIONS

H. Löwe and W. Ehrfeld, State-of-the-Art in Microreaction Technology: Concepts, Manufacturing and Applications, 44 Electrochimica Acta 3679-3689 (1999).*

Gillian M. Greenway et al., The Use of a Novel Microreactor for High Throughput Continuous Flow Organic Synthesis, 63 Sensors and Actuators B 153-158 (2000).*

* cited by examiner

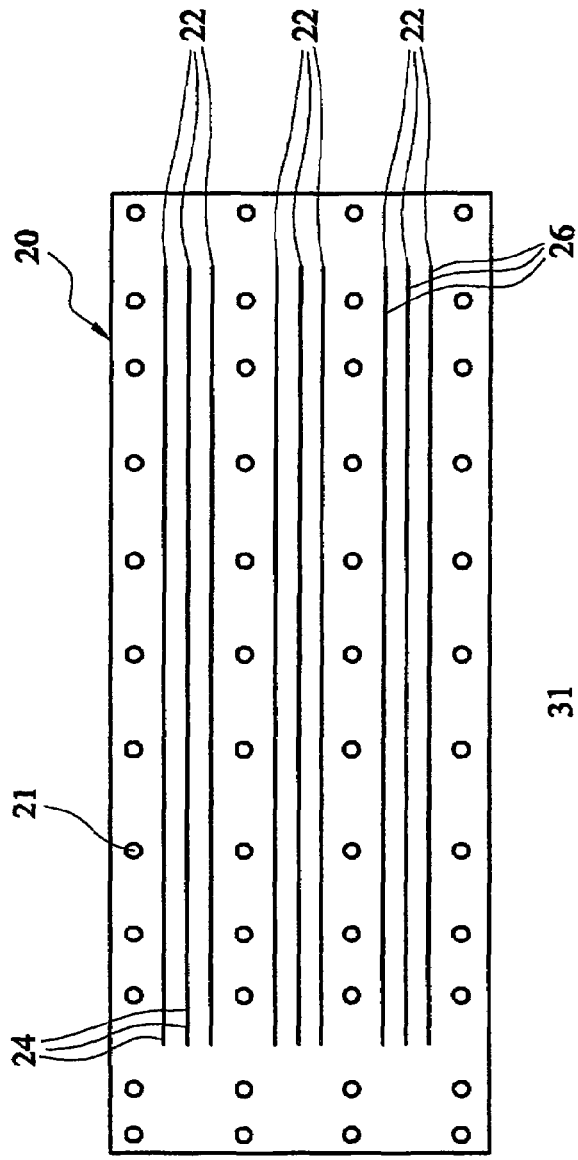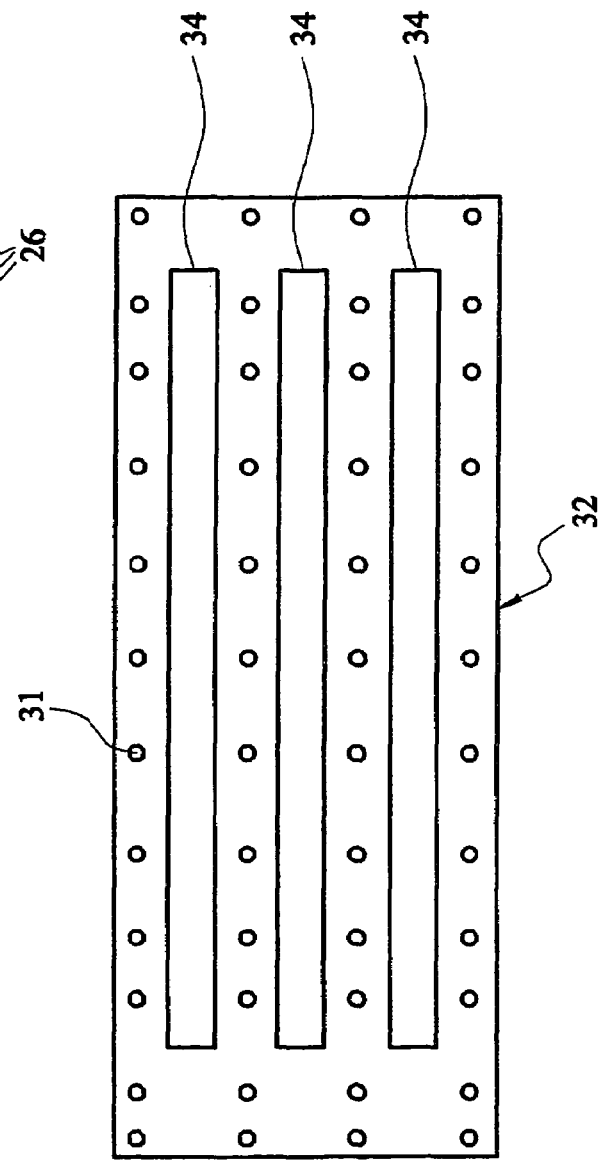
FIG. 2A
FIG. 2B

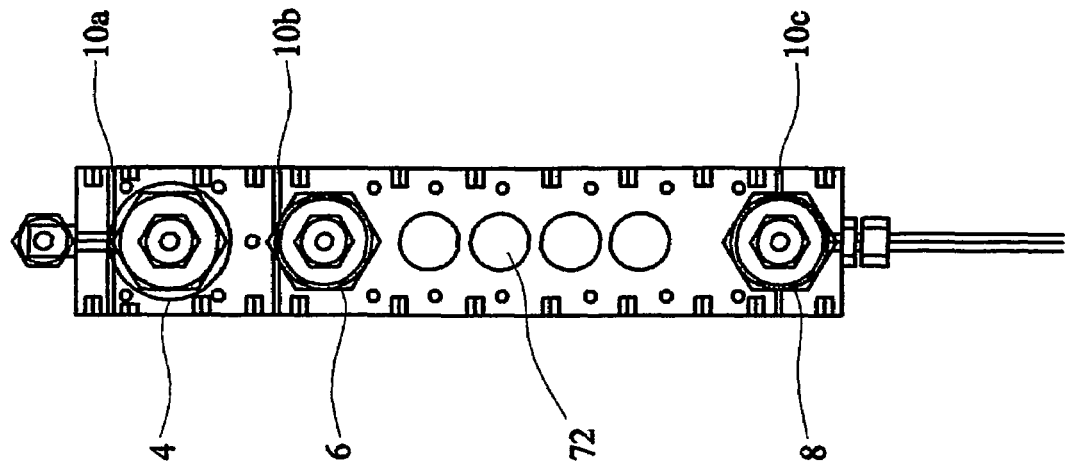
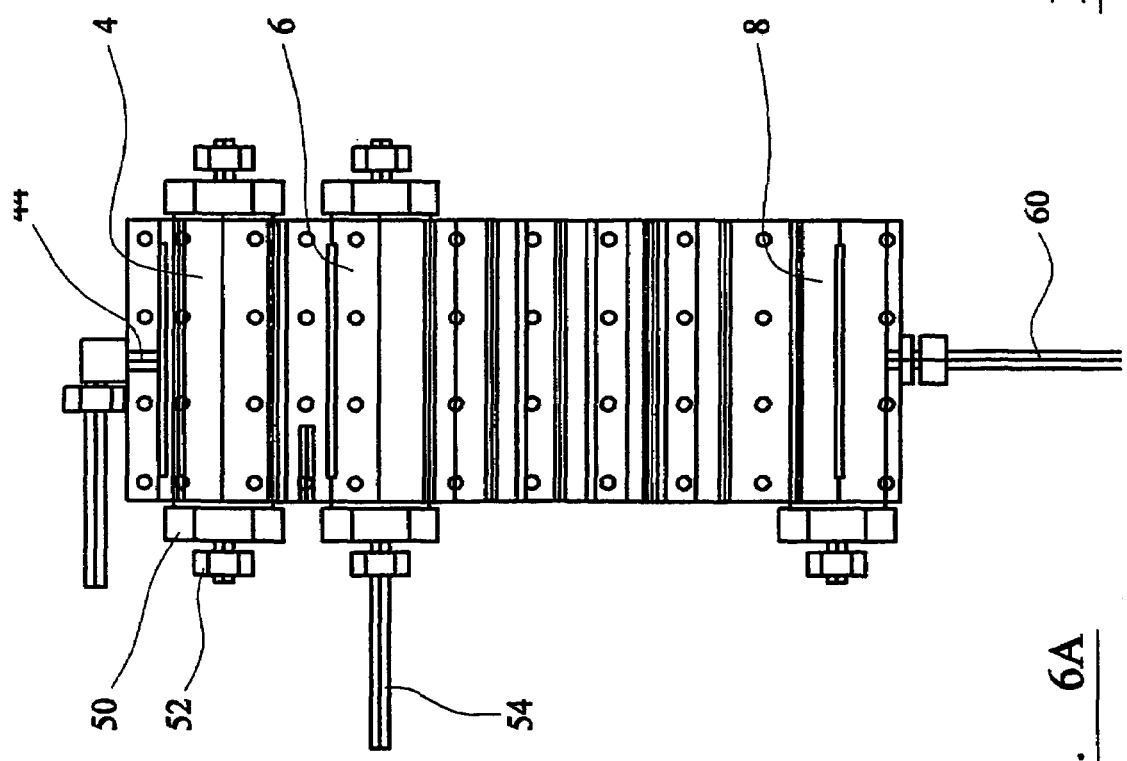

FLUID REACTOR

CROSS-REFERENCE TO RELATED APPLICATIONS

This application is the US national phase of PCT/GB03/01993, filed May 9, 2003, which claims the benefit under 35 USC 119(a) of GB0210809.0. filed May 11,2002.

The present invention relates to a reactor and a method for carrying out a reaction between at least first and second fluids.

There is a large interest in the use of so-called microreactors, i.e. reactors in which the reaction channels have dimensions, perpendicular to the flow direction, typically in the range from 10 to 10,000 micrometers. The benefits of microreactors are numerous and include overall increased control and reaction performance due to factors such as diffusion over very short distances, large contact surface areas and efficient heat transfer to and from the reaction site. In addition, the use of small volumes of reactants in the reaction vessel and the lack of opportunity for aerosol formation lead to increased safety (e.g. in reactions involving either fluorine or oxygen). Microreactors are described for example in WO99/22857, Lab on a Chip, 2001, 1, 132-137 and Chemical Communications, 1999, 883-884. However, the aforementioned references describe microreactors having only a single microchannel or a small number of channels each being fed from its own dedicated source. For commercial use, a series of single, isolated microchannels each fed from its own reactant source would be impractical.

For effective scale-up to commercial operation, one approach is to have multichannel microreactors preferably fed from a single source. Multichannel microreactors are known from WO02/09866 and Journal of Fluorine Chemistry vol 105 (2000) 117-128. In these documents is disclosed a so-called falling film microreactor in which a thin falling film of liquid reactant is caused to flow under gravity through a multitude of microchannels on a plate and a gaseous reactant is caused to flow over the film and a reaction between the liquid and gas occurs. Also described is a so-called micro bubble column which consists of a mixing unit and a reaction unit containing the microchannels. The mixing unit is complex and contains an inter-digital microchannel array for mixing of a gas with a liquid before their introduction into the microchannels. However, these prior art multichannel microreactors suffer from significant disadvantages. For one thing, the prior art designs suffer from being overly complex, e.g. in the way that the reactants are supplied to the microchannels.

The micro bubble microreactor for instance employs a complicated mixing unit. Accordingly, the microreactors are not cheap and easy to manufacture. Another important drawback is that the microchannels of the microreactors are not easily replaceable, which is problematic since periodic changing of the microchannels will be required because the microchannels corrode with use. Furthermore, in the case of the micro bubble microreactor, by mixing the gas and liquid at the same place before introduction to the microchannel, it does not allow for effective cooling of the reagents. hi addition, the mixing unit of the microbubble column necessarily requires close alignment of the channel arrays of the mixer with the microchannels of the microreactor and moreover the channel arrays of the mixing unit may block, especially where the mixing unit and the microchannels of the microreactor meet.

It is an aim of the invention to provide an improved multi-channel microreactor in which the aforementioned problems are reduced or overcome and to provide a microreactor that offers significant benefits over hitherto reported devices. Further aims of the invention will become apparent from the following description.

According to one aspect, the present invention provides a reactor for carrying out a reaction between at least first and second fluids, the reactor comprising a reactor plate having therein a plurality of flow paths in which the at least first and second fluids may react, and a reservoir plate provided in plane parallel relationship to the reactor plate, the reservoir plate having therein at least a first reservoir for the first fluid and a second reservoir for the second fluid, the plurality of flow paths in the reactor plate being in fluid communication with the at least first and second reservoirs.

According to another aspect, the present invention provides a method for carrying out a reaction between at least first and second fluids, the method comprising the steps of providing a reactor plate having therein a plurality of flow paths in which the at least first and second fluids may react, providing a reservoir plate in plane parallel relationship to the reactor plate, the reservoir plate having therein at least a first reservoir for the first fluid and a second reservoir for the second fluid, causing a first fluid to occupy the first reservoir and a second fluid to occupy the second reservoir, and causing the first and second fluids to mix in the plurality of flow paths in the reactor plate.

The flow paths in the reactor plate, which may also be referred to herein as microchannels, have any desired cross-section, for example circular, rectangular or triangular. As there is a potential for blockage of the flow paths due for example to crystallisation of the reactant and/or product where smaller widths are used, in one form of preferred embodiment the cross-section is preferably such that it bounds an inscribed circle of a diameter with a diameter having a value d in the range 10 to 10,000 micrometers. That is to say, a circle with a diameter d is the largest which may be contained within the cross-section without being intersected thereby, so that it necessarily contacts the cross-section at least two locations.

In other embodiments, the preferred maximum width d of the microchannels measured in a plane parallel to the plate and perpendicular to the direction of flow of the first and second fluids is in the range 10 to 10,000 micrometers. This encompasses channel depths (perpendicular to the flow direction and the plane of the plate) which fall outside the aforesaid range, but more preferably the depths also conform to said range.

The channel cross-section chosen for a particular reactor will ultimately be determined by a trade-off between control of the reaction and the rate of production. The number of flow paths in the reactor plate may be varied e.g. 5, 10 or 15. Preferably d above (width or diameter) is no greater than 1,000 micrometers.

The reactor and reservoir plates may be each manufactured simply and cheaply. and are. They may easily be assembled and disassembled as required, for example by being releasably held together by simple fastening means such as screws, clips, clamps or bolts. This permits easy of replacement of either plate independently of the other, and it is noted that normally the reactor plate tend to corrode more rapidly in use and so will be replaced more often.

Typically the reactor plate and the reservoir plate are substantially coextensive (i.e. substantially the same major dimensions) and overlie each other in alignment (i.e. substantially in register).

The reactor may be aligned with its plates horizontal, vertical, or any intermediate position. Commonly the reactor plates will be positioned vertically.

The flow paths may be aligned at any degree to the horizontal, but normally they will be horizontal, as in preliminary trials conducted with reactants under pressure, or vertical to avoid adverse gravity effects on the flow pattern(s).

In the case of gas-liquid reactions, preferably, the dimensions of the flow paths and the fluid pressures involved are such that so-called 'pipe flow' is achieved (also known as annular flow, particularly for circular section paths), that is the liquid forms an outer pipe coating the surface of the flow path with the gas flowing through the centre as shown in FIG. 8A. This is in contrast to so-called 'slug' or 'segmented' flow in which there are alternate segments of liquid and gas in the flow path as shown in FIG. 8B. Pipe flow is particularly advantageous for gas-liquid reactions because the amount and rate of mixing between the gas and liquid is maximised.

The reactor plate may have a major cross-section (in the plane of the plate) which is substantially rectangular. The flow paths commonly will extend parallel to a pair of sides of said rectangular cross-section, often the longer sides where the cross-section is not square. More generally where the major cross-section is elongate, the flow paths will run parallel to the elongate direction.

The reservoir plate is commonly significantly thicker than the reactor plate in order to accommodate the reservoirs which feed the flow paths. Often, but not always, the each reservoir affords a volume substantially greater than the volume of the flow paths which it feeds; it may be as large as can physically be accommodated within the reservoir plate used. The volumes of the first and second reactant reservoirs may be the same or different.

The provision of the reservoirs permits a steady controlled flow of fluid reagents to the flow paths, and the design of the reactors permits rapid mixing of the fluids in the flow paths. It also permits reactions to be performed under controlled pressure(s), and other parameters, particularly temperature, can also be controlled. Thus, for example, where two or more reactors are coupled in series (as for progressive fluorination, which typically will require initial low temperatures and pressures, but higher temperatures and/or pressures to complete the reaction) they may be operated at different temperatures and/or pressures. Control of pressure not only permits control of reaction rate, but control of pressure gradient along the flow paths permits the speed, and hence the dwell time, of reactants in the flow paths to be controlled. However flow under gravity is also possible. Hence a reactor according to the invention may be provided with (a) means for controlling the pressure in and/or pressure gradient along, said flow paths, and/or (b) means for controlling the temperature in the flow paths and/or reservoirs.

The flow paths may be formed in the surface of the reactor plate, preferably the surface which faces the reservoir plate to avoid having to use a top plate (see later with respect to other embodiments) and having to make special arrangements for coupling between the flow paths and the reservoirs. They may for example be formed as grooves or cuts in the surface of the reactor plate.

Alternatively, the flow paths may be formed as slits or channels through the entire thickness of plate. In this case, the thickness of the reactor plate may be, for example, d as defined previously. An additional plate needs to be located on the side of the reactor plate opposite to the reservoir plate. This additional plate may be a second reservoir plate or a simple closure plate, but in either case arrangements may be made for viewing the flow paths (see later).

The reactor plate may be provided with the microchannels by any appropriate method, such as a milling operation, chemical etching and laser machining. Electrical Discharge Fabrication (EDF) techniques can be used for mass production and result in a reproducible channel form and size.

The first reservoir for the first fluid preferably comprises an inlet means for supplying the first reservoir with first fluid. Similarly preferably, the second reservoir comprises an inlet means for supplying the second reservoir with second fluid. The relatively large volume of the reservoirs to the volume of the flow paths ensures that the pressure variation is minimised between the inlets of the reactor and the flow paths, resulting in a more uniform flow rate in the flow paths. Advantageously, by using the reservoirs, there is no significant variation in fluid pressure across the flow paths.

In one type of embodiment, the reservoirs comprise a bore in the reservoir plate. The bore may extend right through the reservoir plate from one side to the other. The bore may extend in a direction which is more across the width of the reservoir plate than along its length which typically runs vertically as mentioned above. The bore may extend substantially width-wise. Thus, the reservoir may extend horizontally in use. It can be seen that the reservoirs may thereby extend in a direction which crosses the plurality of flow paths which typically extend substantially lengthwise along the reactor plate. In one embodiment, the reservoirs may extend in a direction substantially perpendicular to the direction of the flow paths.

Preferably, but not necessarily, the reservoir plate further comprises a product reservoir, the outlet of the flow paths being in fluid communication with the product reservoir. The volume of the product reservoir may be less than the volume of the first and second fluid reservoirs. In extreme cases the product reservoir may comprise a conduit serving to couple the flow paths together but providing no significant storage capacity. This could be desirable in certain types of reaction, for example as in the progressive fluorination reaction where one reactor is coupled in series to one or more further reactors; in such a case the reservoir plate of a succeeding reactor with provide any necessary storage capacity.

External access to/from the reservoirs may be via their ends, or via further passages formed in the reservoir block. Unused open reservoir ends are blanked off.

The flow paths may communicate with the reservoirs directly and there may be a channel provided between the reservoir and the flow paths. Such a channel may be single, i.e. common, channel linking the reservoir to all the flow paths. The channel may be provided as a slot cut in the surface of the reservoir plate, the slot being formed to a depth such that it communicates with the reservoir. Where the reservoir is in the form of a bore extending widthwise substantially through the reservoir plate, the slot may also be formed substantially widthwise, such that it extends across all the flow paths. Preferably the widthwise slot is not formed across the entire width of the reservoir plate but is inset at least slightly from the sides of the plate. A slot may be formed which extends from the surface of the reservoir plate which will contact the reactor plate to the reservoir and joins with the reservoir at a location on the reservoir which is substantially uppermost when the reactor is in use. In this way, when the reservoir fills with reactant, no air pockets are retained in the reservoir since the air may escape via the slot thus, better flow in the reactor is achieved.

The materials used to construct the reactor plate and the reservoir plate can be the same or different. The choice of materials of construction will depend on the nature of the reaction to be carried out. Thus the materials for construction of the reservoir plate are preferably corrosion-resistant (or are rendered corrosion-resistant) to the first and second fluid reactants, and preferably the reactor plate is corrosion-resistant to the first and second fluid reactants and to the product(s) of the reaction. Either of the reservoir plate and reactor plates may be made of a single bulk corrosion-resistant material, or the plates may be made substantially of one bulk material and treated at least on those surfaces which will contact the reactants and/or products so as to confer corrosion resistance, for example by being coated with a corrosion-resistant material, or for example in the case of fluorination reaction by being treated with a fluorinating agent.

A preferred bulk material for construction is stainless steel, which is cheap and reasonably corrosion-resistant to a wide range of materials. Other possible bulk materials are nickel; copper; zirconium; gold; polytetrafluoroethylene (PTFE); a fluorinated material; silicon; silica; glass and other ceramic materials. Corrosion-resistant metals suitable for coating of steel or other bulk material (including silicon, silica, glass and other ceramic materials) include gold; nickel; copper; zirconium; fluorinated material; and some polymer materials such as polytetrafluoroethylene (PTFE). For fluorination reactions for example, the reactor may be formed from stainless steel, nickel, copper or zirconium or another suitable material rendered non-reactive or reaction resistant by preliminary treatment (reaction) with fluorine (thus stainless steel can be given an inert fluoride coating). For some chemical reactions, bulk polymer materials, e.g. polytetrafluoroethylene (PTFE), may be used in the construction of the reactor.

The reactor may be used for liquid-liquid, liquid-gas, or gas-gas reactions. In principle, there is no limit to the type of reactions which may be carried out in the reactor. Some examples include fluorinations, including reaction between a liquid reactant and fluorine gas, nitrations, halogenations, oxidations, hydrogenations, alkylations, acylations, aromatic electrophilic reactions, organo-metallic reactions and catalytic reactions. In particular, the present invention has been found to be useful for fluorination reactions, for example selective direct fluorination (e.g. of carbonyl compounds such as 1,3-dicarbonyl compounds, and of aromatic compounds); the perfluorination of organic compounds; the synthesis of perfluorethers and perfluorocarbons; and the synthesis of organic compounds containing the sulphur pentafluoride group. Hydrogen fluoride may provide an alternative fluid fluorinating agent to fluorine itself in certain reactions.

The reactor may be cooled or heated in use. The reactor may be subjected to external cooling or heating, or the reactor may be provided with integral cooling or heating means. An example of external cooling or heating comprises locating the reactor within an insulated container in which the ambient temperature may be lowered or raised.

Integral cooling or heating means may comprise channels provided in the reservoir plate such that a cooling or heating fluid may be circulated through the channels to cool or heat the reservoir plate and the fluid reactants contained therewithin prior to introduction of the reactants to the flow paths of the reactor plates. The same channels, or different dedicated channels separately provided within the thickness of the reservoir plate(s), may be employed subsequent to the reactant reservoirs to control the temperature of the reaction plate and hence of the reacting fluids as they travel along the flow paths. Thus, for example, a first-stage fluorination may require cooling, whereas a final stage of a perfluorination process (for example carried out in series coupled reactors) may require heating.

Inductive heating could also be used where the material of the reactor is formed of, or coated with, a suitable material.

Further bores may be provided in the reservoir plate to decrease the weight of the plate and/or serve as a means to locate supports for holding the plate.

Preferably a sealing means is provided between the reactor plate and the reservoir plate to ensure a fluid tight seal. The sealing means may be in the form of a gasket, and this may be formed of a polymeric material such as PTFE.

As mentioned previously, where the reactor plate has flowpaths formed in it as slots through the whole plate thickness, a top plate may be required to enclose the flowpaths on the side opposite to the reservoir plate. A further sealing means may be provided between the reactor plate and the top plate; The top plate may be transparent to enable viewing of the flow paths, or opaque, e.g. of stainless steel.

Optionally, a viewing plate of a transparent material may be provided between the reactor plate and the top plate. This may be also serve as the further sealing means or it may be provided in addition thereto. The transparent material may be a polymeric material such as polytrifluorochloro-ethylene (PTFCE). Where a viewing plate is provided, the top plate may have one or more slots cut through to act as a window in order to see through the viewing plate to the flow paths.

Where it is possible to view the flow paths, it is also possible to perform photochemical reactions for example by passing appropriate illumination through a transparent top plate or viewing plate provided as described above.

The closure plate may be substituted by a second reactor plate. This arrangement can be such as to afford a generally symmetrical reactor construction with doubled output. However, other arrangements are possible, for example for performing different reactions in the two reactor plates. These may require the same or different reservoirs of the central reservoir plate to be coupled to each reservoir plate. The different reactions may be completely independent, or linked (for example so that the product from one plate is fed to the second plate as a reactant, as in progressive fluorination; or so that the products from the two reactor plates are then used, or available for use, as reactants for a third reactor).

Advantageously, a plurality of reactors may be used in parallel in a pilot scale or full scale plant. This is a significantly easier option compared to the traditional scaling up process of using larger constructional vessels, etc. and makes it easier to establish good manufacturing practice accreditation. Preferably this is effected so that each reactor can be isolated independently of the others, so that maintenance or replacement of part or whole of one reactor can be performed without affecting continued operation of the others. A plant or pilot plant scale scheme for parallel connection of a plurality of reactors is shown in FIG. 7 and described in more detail below.

A single source of at least one of the reactants may be coupled to the respective reservoirs of (e.g.) parallel coupled reactors. Preferably reservoirs are coupled to the source in parallel to facilitate the above mentioned maintenance/replacement. Alternatively they may be coupled in series with each other with only a single reservoir being directly coupled to the source, in which case it is preferred that each such reservoir, in addition to having an inlet for supplying the reservoir a fluid reactant, also has an outlet for communicating with an inlet of another such reservoir. Provided that the are connections between series reservoirs are of sufficiently low flow resistance, e.g. of sufficiently large bore when they are coupled by separate pipework, this arrangement has the advantage of making the reservoirs act together as though they are a single large reservoir. Consequently, it should be possible to reduce the size of individual reservoirs somewhat with no adverse effects. Combinations of series and parallel coupling could also be used.

A plurality of reactors may be arranged in series, regardless of whether they do or do not already form part of a parallel coupled plurality, so that the product from one reactor provides a reactant for another reactor.

In addition to ease of fabrication and maintenance, microreactors according to the invention provide for relatively safe handling of high energy reactants, such as fluorine, oxygen and nitrating agents, even under pressure and/or at elevated temperatures, because of the low inventory of reactants together at any point in the system.

Further features and advantages of the invention will become clear upon perusal of the appended claims, to which the reader is referred, and upon a reading of the following description of preferred embodiments of the invention, made with reference to the accompanying drawings, in which:

FIG. 2A shows a plan view of a reactor plate according to the invention;

FIG. 2B shows a plan view of a top plate according to the invention;

Figure 7:
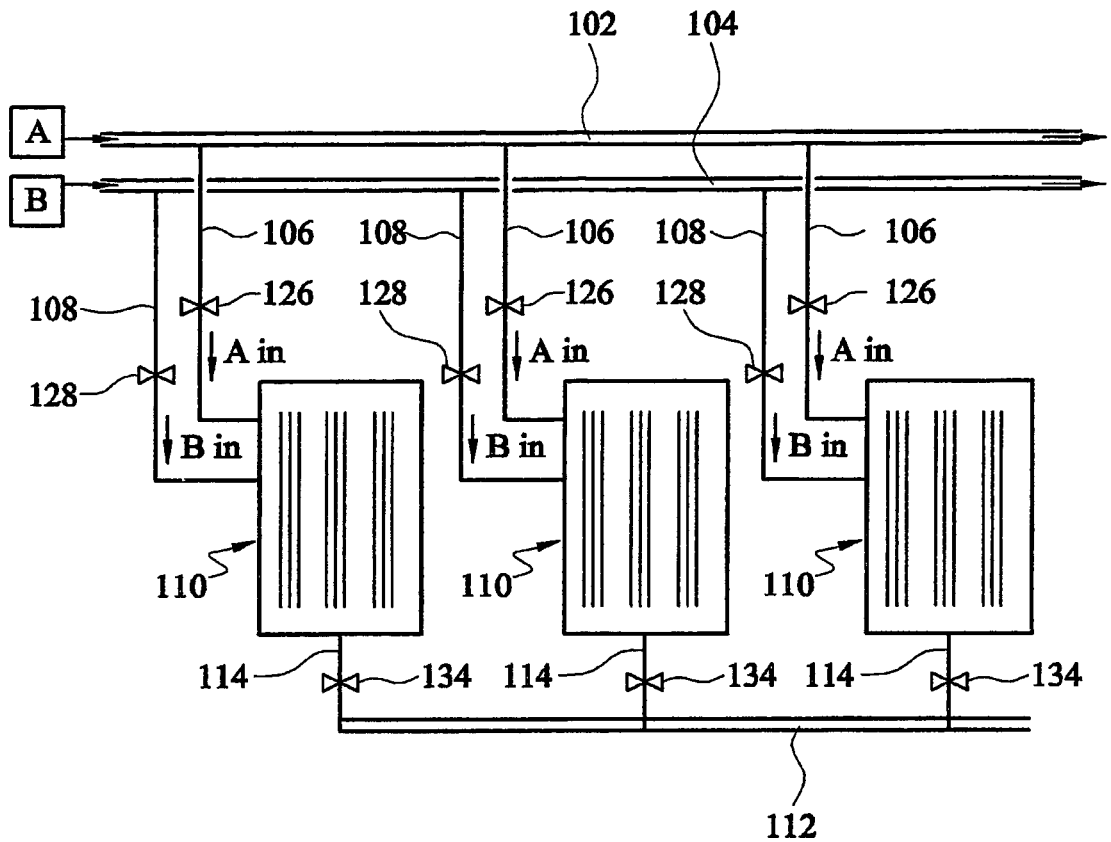
Figures 8A, 8B:
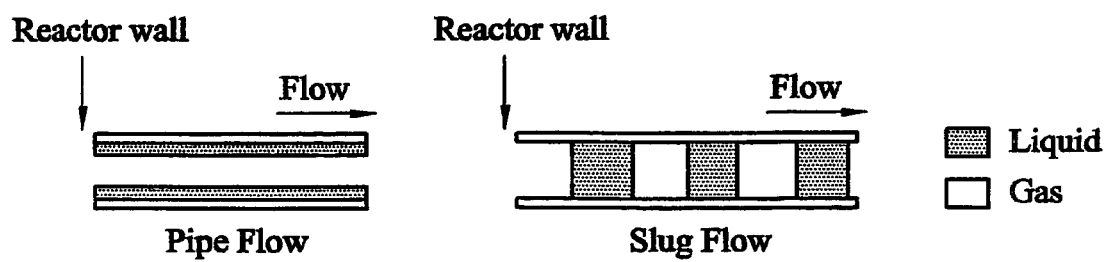

FIGS. 5A-G show in transparent perspective view, successive steps in the manufacture of a reservoir plate according to the invention;

FIGS. 6A and 6B show, respectively, a plan view and side view of a further embodiment of reactor according to the invention wherein the reservoirs are of similar size;

FIG. 7 shows a plurality of reactors according to the invention connected in parallel for plant scale operation; and FIGS. 8A and B show schematically the flow regimes: pipe flow (FIG. 8A) and segmented flow (FIG. 8B).

In the following description, like parts will be denoted by like numerals where appropriate.

Figure 1:
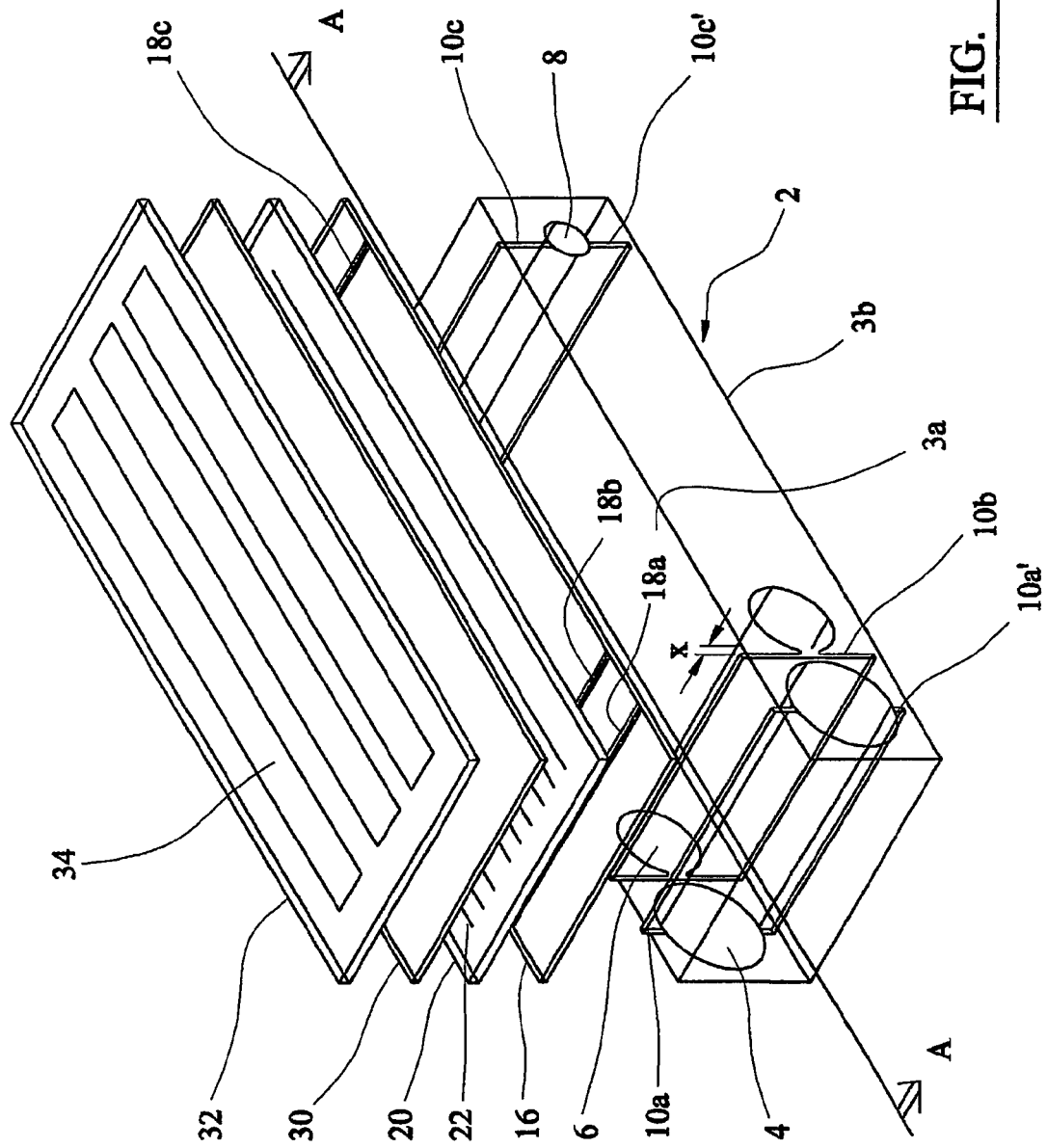
FIG. 1 shows schematically an exploded perspective view of a reactor according to the invention.
Figure 2:
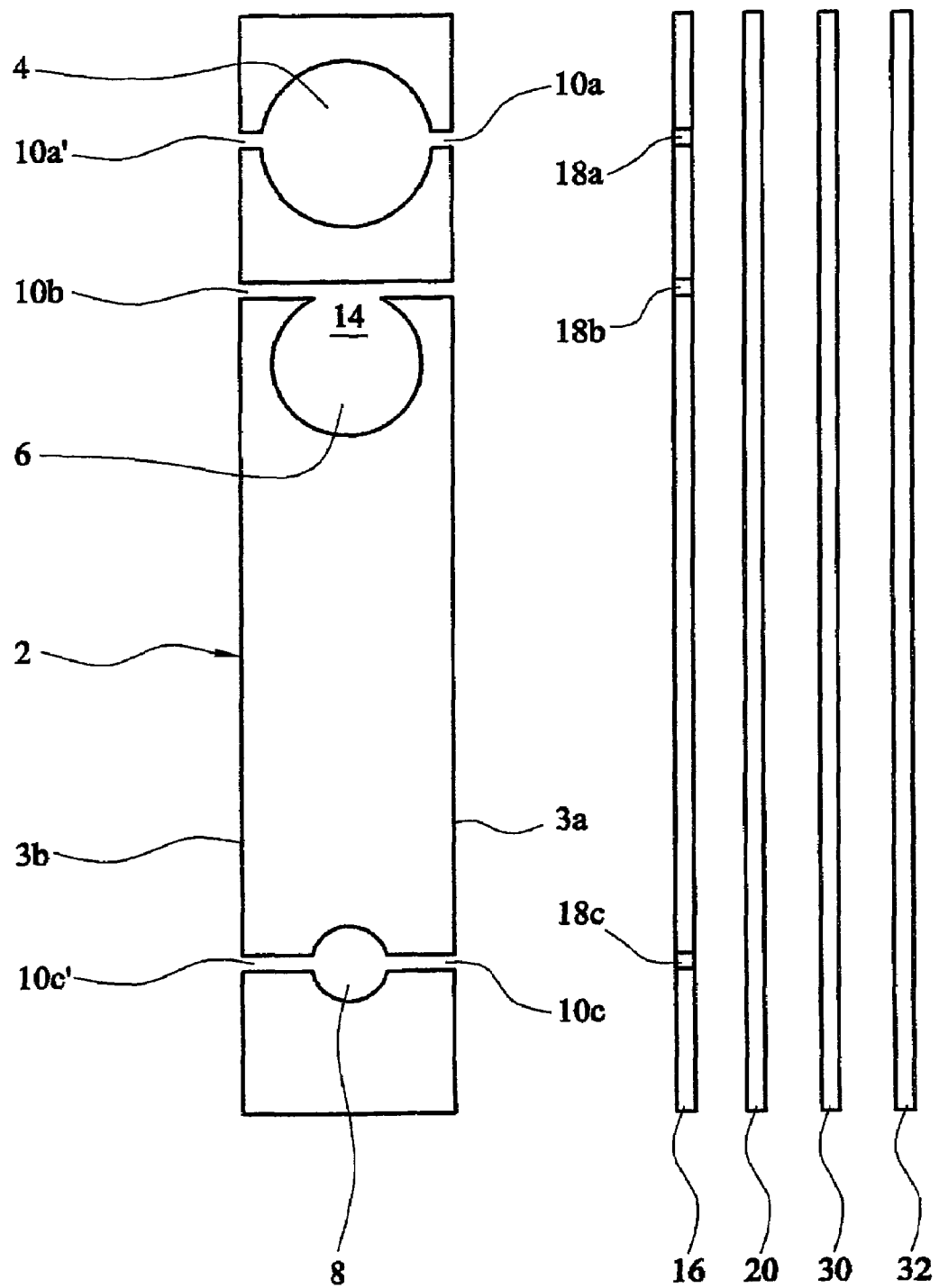
FIG. 2 shows schematically an exploded longitudinal cross-section through line A-A of FIG. 1.

The reactor of FIGS. 1 and 2 has a reservoir plate in the form of a stainless steel rectangular major cross-section block 2 with planar major surfaces 3a and 3b. Block 2 is provided with first and second adjacent fluid reactant reservoirs in the form of respective substantially circular cylindrical bores 4, 6 extending through the block from side to side. A third substantially circular cylindrical bores 8 extends through the block 2 from side to side at the end opposed to reservoirs 4 and 6 and provides a product reservoir.

A slot 10a in the block 2 extends from surface 3a thereof to meet with the centre of reservoir bore 4. For potential use with a second reactor plate a similar slot 10a' may be formed in the block 2 extending from the opposite surface 3b into reservoir bore 4.

A slot 10b in the block 2 extends from surface 3a to surface 3b and intersects tangentially with reservoir bore 6 at position 14, intended in use to be near or at the top of the reservoir bore 6. In this manner, when liquid is in reservoir 6, gaseous matter is not trapped within the reservoir.

Product bore 8 is provided with slots 10c and 10c' in a similar fashion to slots 10a and 10a' for reservoir 4.

The slots 10a, 10b and 10c are all inset from the edge of the block 2 by an amount x, as shown.

If only one side, e.g. side 3a, of the reservoir plate is to be provided with a reactor plate, then slots 10a', and 10c', and the corresponding part of slot 10b maybe omitted, or the side 3b may simply be provided with a blank top plate (not shown) to close these channels.

In use, the reactor is positioned vertically, i.e. with the planes 3a and 3b vertical, and with the reactant reservoirs 4 and 6 positioned above the product reservoir 8.

The slot and reservoir arrangement of the first reactant reservoir 4 is suitable for a gaseous first reactant, but may not be the most effective design for a liquid reactant since gas pockets could develop in the reservoir 4 and affect efficient fluid flow through reservoir 4 and slots 10a, 10a'. A better arrangement for liquid reactants is that of slot 10b and reservoir 6, such that problems of air pockets are eliminated by having the slot 10b at the top of the reservoir 6. A reactor could be made wherein first and second reactant reservoirs 4 and 6 and, optionally also the product reservoir 8, each have slots arranged to communicate with the reservoirs at uppermost points of the reservoirs. Such a reactor is useful for gas and/or liquid reactants for the fill range of gas—gas, liquid—liquid, and liquid—gas reactions.

A rectangular sealing gasket 16, of substantially the same area as block 2, in the form of a thin polytetrafluorothylene (PTFE) plate, is employed between surface 3a of reservoir plate 2 and reactor plate 20, to ensure a fluid tight seal therebetween. Gasket 16 is provided with through slots 18a, 18b and 18c, in register with the slots 10a, 10b and 10c respectively in the reservoir plate, thereby to allow fluid flow through gasket 16 to the reactor plate 20.

A substantially coextensive rectangular reactor plate 20 is positioned in register on the surface 3a of reservoir plate 2. Reactor plate 20 is much thinner than reservoir plate 2.

The stainless steel reactor plate 20 is shown in plan view in FIG. 2A. It comprises nine parallel slots 22 through the plate which are of microchannel size, i.e. 10-10,000 micrometers wide. Trial reactions have been effected using a plate 20 with 500 micrometer (0.5 mm) wide microchannels 22. Holes 21 are provided in the reactor plate through which screws may pass which screw into the reservoir plate, thereby to fasten the reactor plate to the reservoir plate.

The ends 24 of the microchannels 22 extend longitudinally (i.e. lengthwise) sufficiently to overlap with the position of slot 10a, such that first fluid reactant may flow in use from reservoir 4, through slot 10a and 18a in gasket 16, into the microchannels 22 in the reactor plate 20. Similarly, slot 10b from the second fluid reactant reservoir 6 communicates, via slot 18b in gasket 16, with the microchannels 22. The opposite ends 26 of the microchannels 22 overlap with product slot 10c, such that product formed from reaction of the first and second reactants in the microchannels 22 can exit the microchannels via slot 10c and thereby via product exit reservoir 8.

A viewing plate 30 of transparent polytrifluorochloroethylene (PTFCE) in register over the reactor plate provides a fluid tight top seal to the microchannels 22 of the reactor plate 20 and allows a visual check of the microchannels in use.

A top plate 32, made of stainless steel, and again of substantially the same width and length as the reactor plate, is provided over viewing plate 30 to protect it. As shown in FIG. 2B, windows 34 are cut in top plate 32 to give visual access to and through viewing plate 30. Slots 34 register with the microchannels 22 to allow them microchannels to be viewed through viewing plate 30. The viewing plate and top plate also have holes 31 through for screw fastenings.

Figure 3:
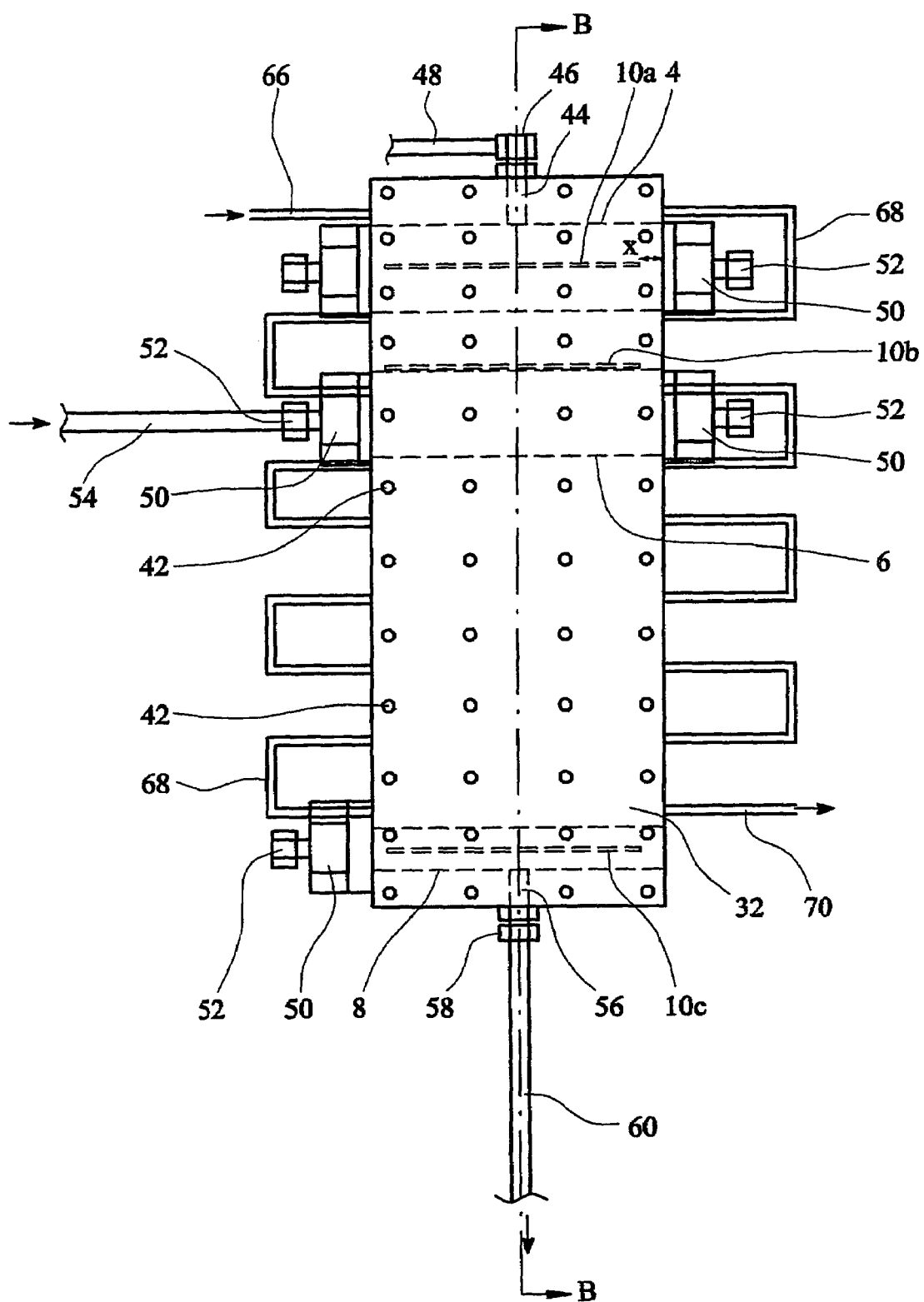
FIG. 3 shows a plan view of a reactor according to the invention.
Figure 4:
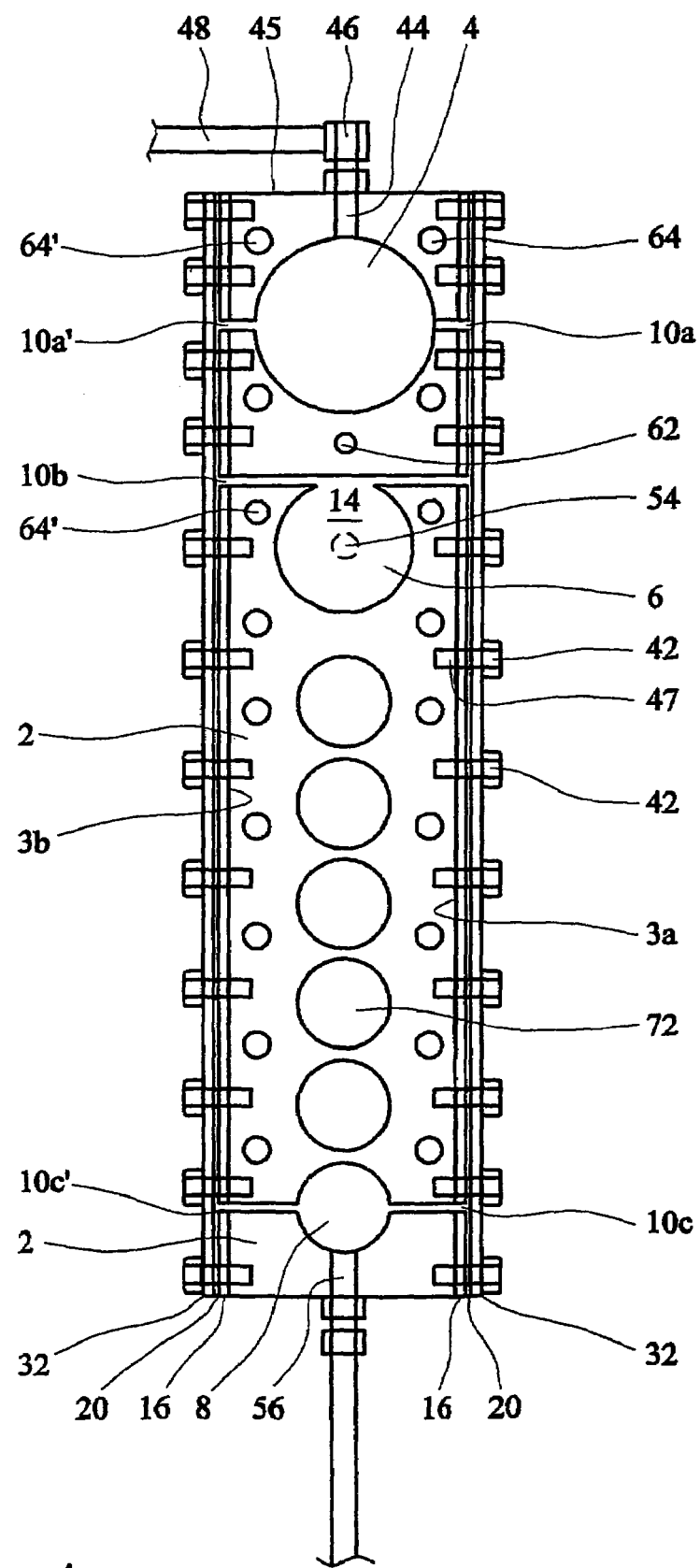
FIG. 4 shows a longitudinal cross section along the line B-B of FIG. 3.

In FIGS. 3 and 4 a rectangular stainless steel block 2 constitutes the reservoir plate forms the centre of the reactor with a reactor plate 20 on each side thereof. The construction of the reservoir block 2 is described in detail below with reference to FIGS. 5A-G. Block 2 is 250 mm long, 96 mm wide and 50 mm thick, and has principal planar surfaces 3a and 3b.

A reservoir 4 in the form of a cylindrical bore 40 mm in diameter is milled through the block 2 across the full width of the block. A reservoir 6, 30 mm in diameter is milled through the block 2 across the full width of the block at a position near reservoir 4. A reservoir 8 in the form of a cylindrical bore 20 mm in diameter is milled through the block 2 at the end of the block opposite to that with reservoirs 4 and 6. Reservoir 8 is for collection of the product.

Slots 10*a* and 10*a'*, 2 mm wide, are milled from the principal surfaces 3*a* and 3*b* respectively of the block 2 into the reservoir 4, thus connecting the reservoir 4 to the reactor plate as described further below. Slots 10*a* and 10*a'* are 84 mm long, thus terminating at a distance (x) 6 mm from each edge of the reservoir block 2 as shown in FIG. 3. A slot 10*b*, 2 mm wide, is milled through the block 2 from surfaces 3*a* to 3*b*. Slot 10*b* intersects the top edge 14 of reservoir 6 as shown. Similarly, slot 10*b* is 84 mm long, thus terminating 6 mm from each edge of the reservoir block 2. Slot 10*b* thus forms a channel connecting reservoir 6 to the reactor microchannels of the reactor plates. Slots 10*c* and 10*c'* similarly 84 mm long, and 2 mm wide, are milled from the surfaces 3*a* and 3*b* of the block into reservoir 8. The slots 10*c*, 10*c'* and again terminate 6 mm from each edge of the reservoir block 2.

The reservoir 4 is suitable for use with a gas reactant. The reservoir 6 is suitable for a liquid reactant. It should be noted that the reactor shown in FIGS. 3 and 4 has been designed with a gas-liquid reaction in mind. If, however, a liquid-liquid reaction, for example, is to be carried out, preferably the two reservoirs 4 and 6 and their respective slots 10*a*, 10*b* should both have the arrangement of reservoir 6 with its tangential slot 10*b*.

Block 2 is provided with a forty eight threaded holes 46 for receiving 4 mm stainless steel screws 42, which secure the gasket 16, reactor plate 20 and top plate 32 to the reservoir plates.

A channel 44 which is internally threaded, is milled from the top edge 45 of the reservoir block 2 into reservoir 4, thereby to provide an inlet for supplying a first fluid reactant, e.g. a gas, into reservoir 4. A 90° pipe fitting 46 is connected into inlet channel 44 and a ¼" inlet pipe 48 is connected to the 90° fitting 46. The other end of pipe 48 (not shown) is for connection to a source of a first fluid reactant, e.g. a gas cylinder. Where the first reactant is a gas, a mass flow controller or similar (not shown) may be employed between the source of the reactant and the reservoir inlet 44 to regulate the amount and pressure of first reactant flowing into the reservoir 4.

Unused ends of the reservoir 4 may be blanked off, for example where the reservoir is not to be coupled to reservoir(s) of other reactors, by means of stainless steel fittings 50. The stainless steel fittings 50 may have an externally threaded portion for engagement with an internally threaded portion inside the bore of reservoir 4. The stainless steel fittings 50 may be provided with a Swagelock (trade name) joints 52 which can be closed off using a blanking component.

It should be noted that when the reservoir is to be coupled to reservoirs of other series/parallel connected reactors, the Swagelock joints 52 could, for example, be used instead for connection to a length of connecting pipe, in turn connected to a similar Swagelock joint of an adjacent reactor. In this way, the source of reactant need only be connected to the inlet 44 of one of the reactors.

Alternatively, instead of supplying reservoir 4 with first fluid reactant through inlet channel 44, the inlet channel 44 could be blanked off and the reservoir 4 could be supplied via one of the fittings 50 in the same manner as for reservoir 6 now to be described.

The ends of reservoir 6 are provided with an internally threaded portion. Stainless steel fittings 50 having an externally threaded portion are engaged in the ends of reservoir 6. The stainless steel fittings 50 are provided with a Swagelock (trade name) joint 52. One of the Swagelock fittings is connected to a ¼" pipe 54 for connection, in turn, to a source of second fluid reactant (not shown). Where the second fluid reactant is a liquid, a syringe pump (not shown) may provide the reactant in measured amounts and pressure to the reservoir 6 via pipe 54. Where the reservoir 6 is not to be coupled to reservoir(s) of one or more further reactors, the other Swagelock fitting 52 may be closed off using a blanking component. Where the reactor is to be connected to one or more other reservoirs, the Swagelock joint 52 could, for example, be used instead for connection to a length of connecting pipe, in turn connected to a similar Swagelock joint of a reservoir 6 of an adjacent reactor. In this way the source of second reactant need only be connected to the inlet of one of the reservoirs.

An outlet channel 56 is milled from the bottom edge 57 of block 2 into product reservoir 8. Channel 56 is internally threaded and fitted with a stainless steel pipe fitting 58, in turn connected to an outlet pipe 60 which communicates product ultimately to a collection reservoir (not shown). Product reservoir 8 is similarly internally threaded at its ends and provided with stainless steel fittings 50 with Swagelock joints 52. Again, it is possible to employ the Swagelock joints to connect product reservoirs 8 of two or more reactors together.

A thermocouple hole 62 is also milled in the reservoir block 2 approximately mid-way between reservoirs 4 and 6 for accommodating a thermocouple to determine the temperature of reservoir block 2 during use.

Two sets of cooling or heating channels, 64 and 64', 3 mm diameter, are milled through the reservoir block 2 near to the surfaces 3*a* and 3*b* respectively. An end most channel of each set of cooling or heating channels 64, 64' is provided with a copper inlet pipe 66 welded thereto for supplying cooling or heating fluid into the channels. The ends of adjacent channels are connected to each other by means of copper pipe loops 68 which carry the cooling or heating fluid from one channel 64, 64' to the next. The last channel is provided with an outlet pipe 70 for removal, and optionally recirculation, of cooling or heating fluid.

A PTFE gasket film 16 is positioned in register on the surface 3*a* of the reservoir block 2. A similar gasket is placed on the opposite surface 3*b* of the reservoir block 2. Gasket 16 is provided with through slots 18*a*, 18*b* and 18*c* in register with the slots 10*a*, 10*b* and 10*c* in the reservoir plate to allow fluid flow through gasket 16 to the reactor plate 20.

Stainless steel reactor plates 20 each constructed similarly to that shown in FIG. 2*a*, and having nine 500 micrometers (0.5 mm) wide microchannels, are located adjacent each of the gasket plates 16.

In this embodiment there is no viewing plate, a plain top plate 32 without any windows being located adjacent each reactor plate 20 to seal the microchannels 22.

Each of the gaskets 16, reactor plate 20 and top plate 32 is provided with 48 holes for registering with the screw holes 47 in the reservoir plate. Stainless steel screws (4 mm) 42 are then located through the holes in the top plate, reactor plate and gasket and screwed into the underlying screw hole 40 in the reservoir block 2. Even tightening of the screws 42 by a torque wrench ensures adequately sealing between each reactor plate 20, its top plate 32 and the reservoir block 2 by the gaskets 16.

In use, a first fluid reactant, e.g. gas from a gas cylinder, is introduced into the first reactant reservoir 4 via the inlet channel 44 and inlet pipe 48 using a mass flow controller. Simultaneously, a second fluid reactant, e.g. a liquid, is introduced into the second fluid reactant reservoir 6 via the inlet pipe 54 using a syringe pump. When the first fluid reactant reservoir 4 is filled with reactant, the reactant flows through the slots 10*a* and 10*a'*, through slot 18*a* in gasket 16, and into the microchannels 22 of the reactor plate 20. The first fluid reactant then flows along the microchannels 22 of the reactor plate towards the outlet end. Similarly, the second fluid reactant after filling the reservoir 6 flows along slot 10b, through slot 18b in gasket 16 and into the microchannels 22 of the reactor plate. The second fluid reactant then mixes rapidly and effectively with the first reactant in the microchannels for reaction as they travel along the microchannels towards the output.

Where the first fluid reactant is a gas and the second fluid reactant is a liquid, it has been found that the reactants, move along the microchannel by pipe flow, i.e. the liquid forms an outer pipe coating the surface of the microchannel with the gaseous reactant flowing through the centre of the liquid reactant. This type of flow has been found to be ideal for a gas-liquid reaction due to maximised mixing between the phases and a heat transfer to the reactor from the reaction zone. A gas-liquid reaction which has been found to be efficiently performed using the reactor of the invention is that of fluorination of a liquid substrate using fluorine gas.

If cooling or heating of the reactants prior to introduction into the microchannels is required, a cooled or heated fluid may be passed through the channels 64, 64' in the reservoir block 2. By providing channels in the reservoir block, it has been found that the reactants may be efficiently cooled or heated, as a result of their long residence time in the reservoirs 4 and 6, before their introduction into the micro channels.

Additional bores 72 may be milled through the block 2 to decrease the weight of the block. Support members (not shown) may be passed through the bores 72 to support the reactor in use.

Where replacement of a reactor plate for instance is needed, screws 42 may be removed to allow top plate 32 and reactor plate 20 to be removed. Then a fresh reactor plate can be put on the reactor and the top plate 32 replaced. No other disruption to the reactor assembly is required. A reactor plate can be replaced on one side of the reactor without disturbing the reactor plate on the other side. Furthermore, where a number of reactors are connected in series or parallel, the reactor needing maintenance may simply be isolated from the others whilst the repair is carried out, while the other reactors continue operating.

Figure 5A:
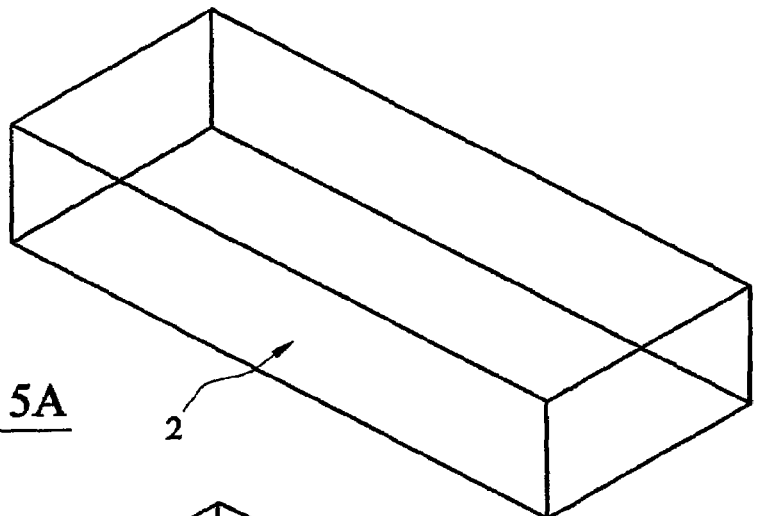
Figure 5B:
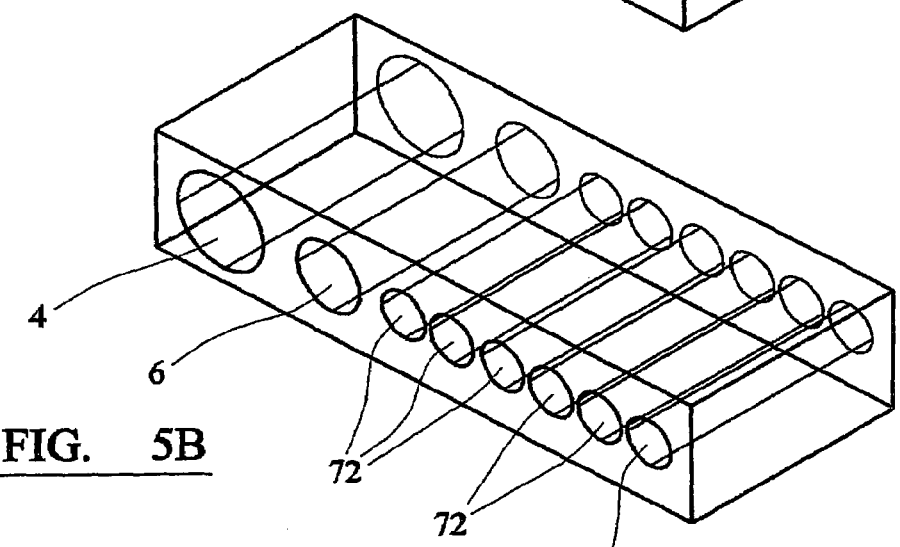
Figure 5C:
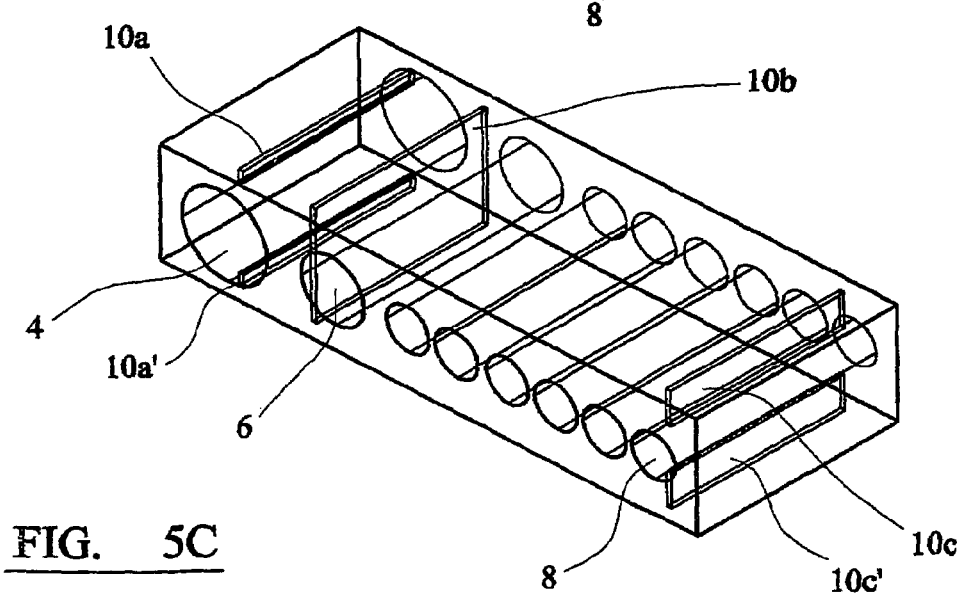
Figure 5D:
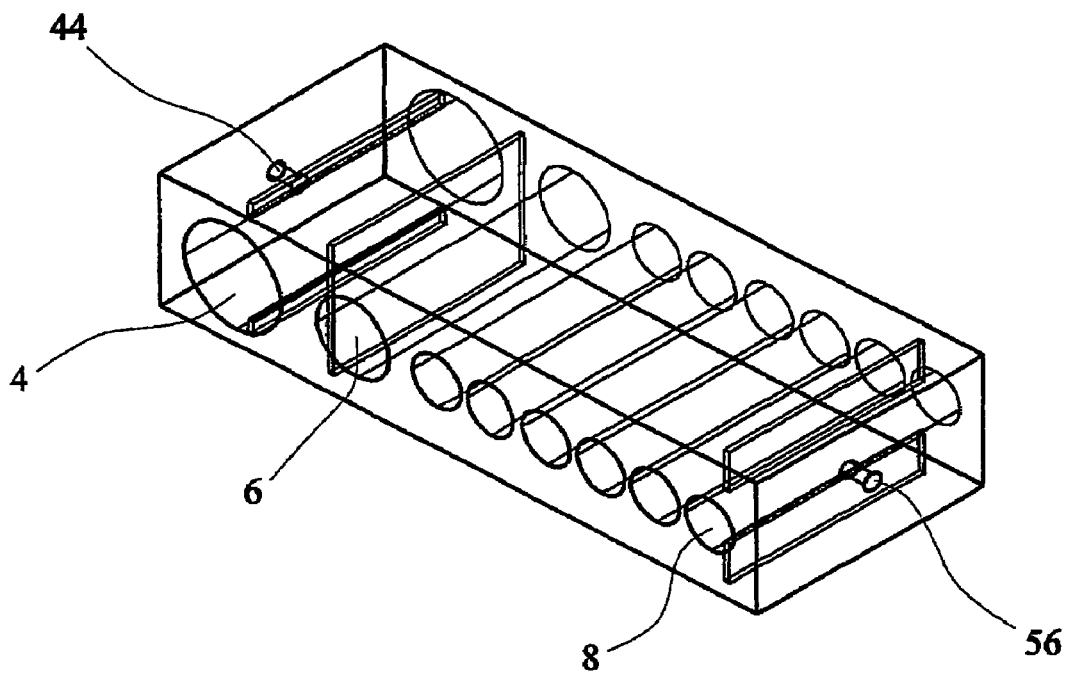
Figure 5E:
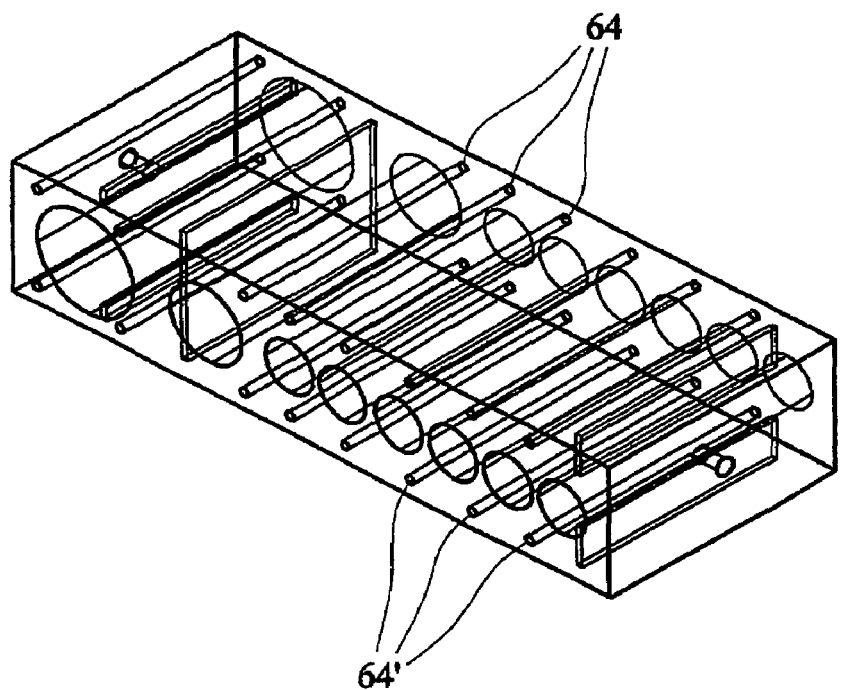
Figure 5F:
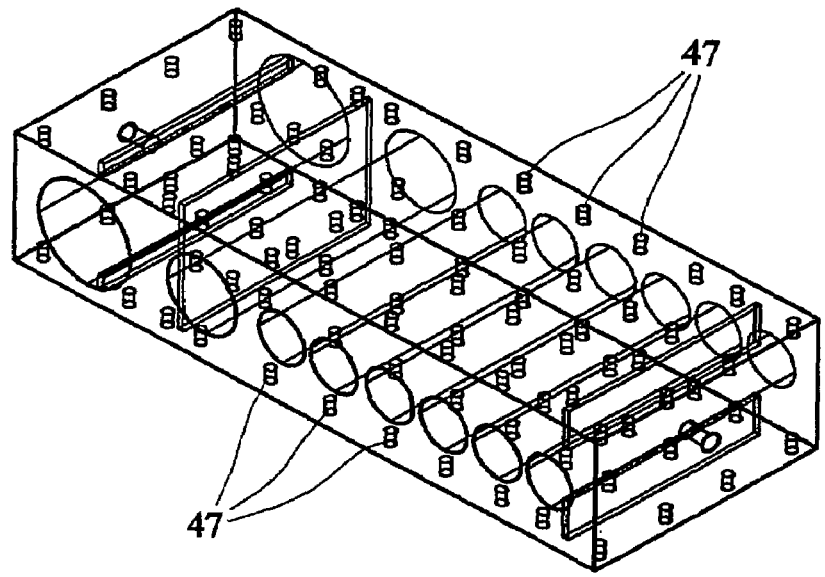
Figure 5G:
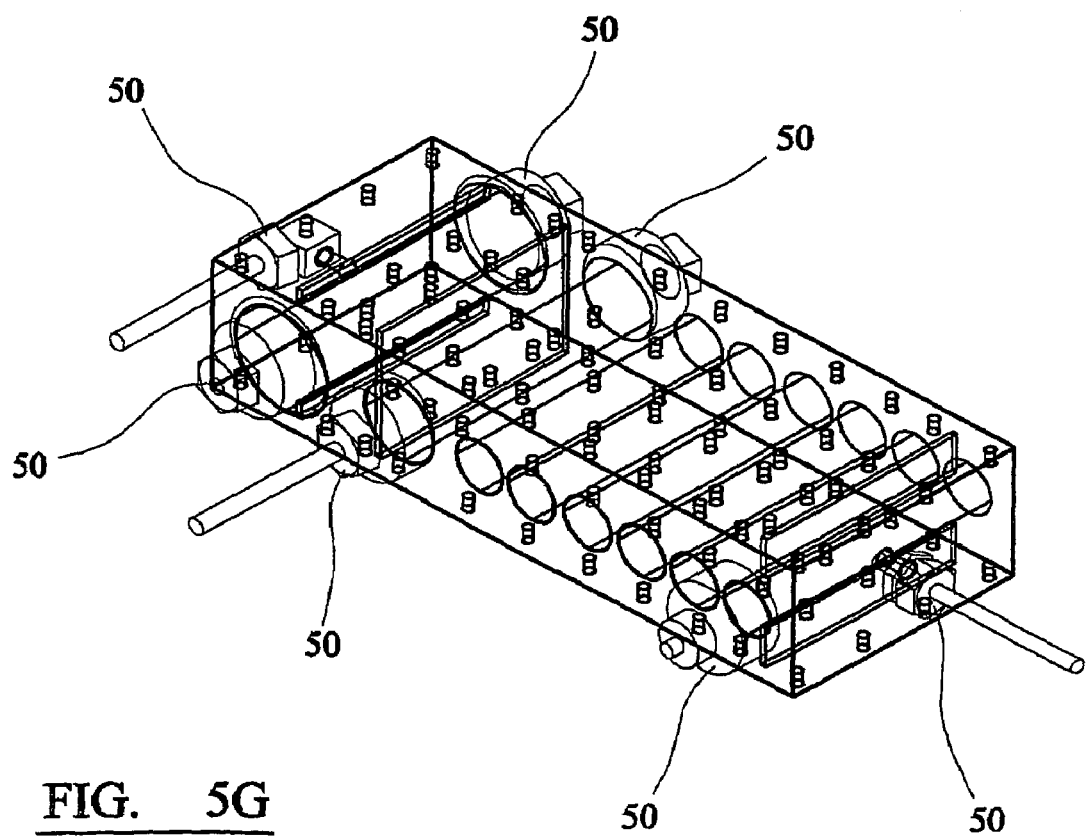

Referring to FIGS. 5A-G, there is shown, in transparent form, the successive stages in one possible manufacture of a reservoir block 2 as employed in FIGS. 1-4. A stainless steel rectangular block 2 (FIG. 5A) first has throughbores 4, 6 and 8 drilled therein which constitute the first and second reactant and product reservoirs respectively. Bores 72 are also drilled to reduce weight and provide a means for supporting the reactor. Next, with reference to FIG. 5C, the slots 10a and 10a' as aforementioned are cut into the block 2 to meet with opposite sides of the reservoir 4. The slot 10b is cut through the block such that it meets the edge of reservoir 6. The slots 10c and 10c' are cut into the block to meet with opposite sides of the reservoir 8. With reference to FIG. 5D, the first reactant inlet port 44 and the product outlet port 56 are drilled in the block 2 to meet with reservoirs 4 and 8 respectively. The next step is the provision of drilled cooling/heating channels, 64 and 64' (FIG. 5E), and drilled screw holes 47 (FIG. 5F). Lastly, the reservoirs 4, 6 and 8 are provided with internally threaded portions near their ends so that threaded Swagelock (tradename) fittings 50 can be fitted to the reservoirs as shown in FIG. 5G. Similarly, the inlet 44 and outlet 56 are internally threaded near their ends so that Swagelock (tradename) fittings 50 can be fitted thereto.

The reactor of FIGS. 6A and B is similar that of FIGS. 3 and 4, but reservoirs 4, 6 and 8 are of similar bore diameter, which simplifies manufacture and enables maximum total reservoir volume for a given plate thickness. In addition the channel 10a is positioned at the top edge of the reservoir 4, similar to the configuration of the slot 10b with reservoir 6, thereby eliminating the problem of gas pockets if the reservoir 4 is used for a liquid. The cooling/heating tubes 68 have been omitted, but it remains possible for the reactor to be cooled or heated for example by means of a cryostat or thermostat.

FIG. 7 shows a scheme for a scaled-up operation, i.e. suitable for a full size plant or a pilot plant. It will appreciated that in practice as many reactors are used as are needed, and this may be tens or hundreds of such reactors. FIG. 7 shows three reactors 110 connected in parallel for continuous operation. First fluid reactant A, fed from a single source A, flows along a main feed line 102. Second fluid reactant B fed from a single source B, flows along a main feed line 104. Branch feed lines 106 and 108 lead from the main feed lines 102 and 104 respectively to supply the first and second reactants to the reactant reservoirs of each of the microreactors 110 as shown. Each reactor output is connected to a branch product line 114 which, in turn, supplies main product line 112. The main product line 112 ultimately connects to a collection means (not shown) for the product. Conventional separation processes may thereafter be employed for the product. Isolation valves 126 and 128 in lines 106 and 108 respectively and isolation valves 134 in lines 114 enable any given reactor 110 to be isolated for maintenance or replacement whilst the other reactors 110 continue to function without interruption.

Thus far only reactors with a pair of reservoirs have been considered. In such a case the spacing between the reservoirs, i.e. the distance which the one fluid has to travel in the reactor plate before it meets and reacts with the second fluid, would not normally be an essential consideration, although clearly it is normally beneficial to have the reservoirs close to each other to minimise the overall size of the reactor. There is only one reaction to be taken into account, viz. that between the first and second fluids. However, it is of course possible to provide a third reservoir for a third different reacting fluid.

In certain cases it may be necessary or desirable for all three reacting fluids to be simultaneously present during a reaction, and under such circumstances it is desirable that the corresponding reservoirs are located closely adjacent each other in the reservoir plate so that they mix as nearly simultaneously as possible in the reaction channel(s) (possibly an exception could be made for the first fluid to be introduced into the reaction plate, but again other considerations normally make it preferable that the first reservoir is closely adjacent the other reservoirs).

However, in other cases it may be desired to arrange the reactor so that more than one reaction occurs as the fluids travel along the path in a single reaction channel. For example, it may be desired that a first reaction occurs between first and second fluids to yield a first product which is then caused to undergo a second reaction with the third fluid to yield a second product. In this case, it may very well be desirable to allow a minimum residence time for the combination of the first and second fluids, to allow the reaction to proceed to a desired extent, prior to introduction of the third fluid. For this purpose, the second reservoir, which may or may not be closely adjacent the first reservoir, is spaced from the third reservoir by a distance allowing the first product to be formed to the desired extent before it is contacted by the third fluid, the second product ultimately being collected from the product reservoir. The distance between the second and third reservoirs will be determined by the flow rate in the reaction channel, in turn determined by control of parameters such as pressure and temperature/viscosity, and the necessary dwell time.

While the particular case of three fluids and a simultaneous reaction or two consecutive reactions has been considered here, the details can be extended to four or more fluids and/or more than two reactions, where the latter may or may not require the simultaneous presence of more than two of the fluids (or more than one fluid plus product from a preceding reaction).

Examples of reactions carried out using a reactor according to the invention are now given.

EXAMPLE 1

Direct Fluorination of Ethyl 3-oxobutanoate 1

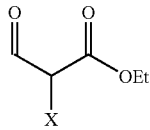

1, X = H
2, X = F

Fluorine gas in nitrogen (20% v/v) was passed through the 9-channel microreactor of FIGS. 3 and 4, whose channel dimensions were 0.5 mm×0.5 mm×10 cm, via inlet port 44 and reservoir 4 at a prescribed flow rate of 15 ml per minute per channel. A stock solution of ethyl 3-oxobutanoate 1 (270 g, 2.08 mol) in formic acid (380 g, 8.26 mol) was injected by a mechanised syringe pump into the microreactor channels through the substrate inlet port 54 and reservoir 6 at a prescribed rate of 0.5 ml per hour per channel. The microreactor was cooled externally by a cryostat to 5° C. After passing through the microreactor and tubing, excess fluorine gas and volatile waste products were passed through a scrubber filled with soda lime. Liquid products were collected in an FEP tube which was cooled externally and, after all of the starting material had been passed through the microreactor (a total of 19 hours), the liquid product mixture was added to water. Extraction into dichloromethane, washing with saturated NaHCO$_3$ solution, drying (MgSO$_4$) and evaporation of the solvent under reduced pressure gave a colourless oil (132.8 g) which contained ethyl 2-fluoro-3-oxobutanoate 2 (94% yield, 93% conversion). Purification by either distillation under reduced pressure or column chromatography on silica gel gave ethyl 2-fluoro-3-oxobutanoate 2 as a colourless liquid. Identification of ethyl 2-fluoro-3-oxobutanoate 2 was achieved by comparison of spectra with those of an authentic sample.

EXAMPLE 2

Direct Fluorination of 1-Methyl-2,4-dinitrobenzene 3

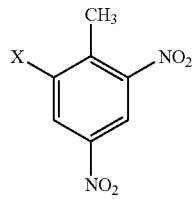

3, X = H
4, X = F

By a procedure similar to that described in Example 1, fluorine in nitrogen (10% v/v) at a prescribed flow rate of 10 ml per minute per channel and a stock solution of 1-methyl-2,4-dinitrobenzene 3 (8.0 g, 44 mmol) in acetonitrile/formic acid (3:2 ratio, 300 ml) was passed through the 9-channel microreactor at a rate of 2 ml per hour per channel. After passage of all reagents through the microreactor, work up as described in Example 1, gave a crude oil (11.4 g, 40% conv.) that contained 1-fluoro-2-methyl-3,5-dinitrobenzene 4 (70%). Column chromatography on silica gel with a 1:1 diethyl ether: 40/60 petroleum spirit as elutant gave 1-fluoro-2-methyl-3,5-dinitrobenzene 4 as a yellow oil. Identification of 1-fluoro-2-methyl-3,5-dinitrobenzene 4 was achieved by comparison of spectra with those of an authentic sample.

EXAMPLE 3

Fluorination of 3-Nitrophenyl Disulfide 5

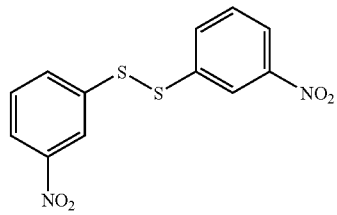

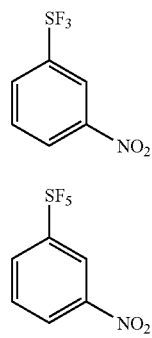

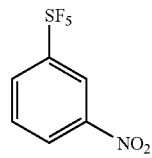

3-Nitrophenyl disulfide 5 (6.0 g, 19 mmol) was dissolved in dry acetonitrile (300 ml) and cooled to 0° C. Fluorine as a 10% mixture in nitrogen (v/v) was passed through the stirred solution at a rate of 75 mlmin$^{-1}$ (20 mmolh$^{-1}$). At hourly intervals, a sample (1 ml) was removed and the amount of 3-nitrophenyl sulfurtrifluoride 6 (62% conv.) present was calculated by comparison of the $^{19}$F nmr integral to that of an internal reference (trifluoromethylbenzene).

A portion of the reaction mixture containing 3-nitrophenyl sulfurtrifluoride 6 was syringed from the bulk fluorination apparatus (150 ml) under nitrogen, and passed through the nine channel microreactor maintained at 20° C., at a rate of 7.3 mlh$^{-1}$ per channel (0.51 mmol of 3-nitrophenyl sulfurtrifluoride h$^{-1}$ per channel). Simultaneously, a flow of fluorine in nitrogen (10% v/v) was initiated at a prescribed flow rate of 10 ml per minute per channel. After passage of all reagents through the microreactor, work-up gave a crude orange oil (7.3 g), which contained 3-nitro-1-(pentafluorosulfur)benzene 7 (56%). Purification was achieved by chromatography on silica gel with dichloromethane as elutant gave a sample of 3-nitro-1-(pentafluorosulfur)benzene 7 as an orange oil. Identification of 3-nitro-1-(pentafluorosulfur)benzene 7 was achieved by comparison of spectra with those of an authentic sample.

EXAMPLE 4

Oxidation of Cyclohexanol 8

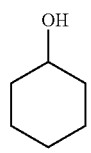

-continued

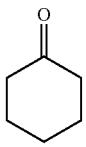
9

By a procedure similar to that described in Example 1, fluorine in nitrogen (10% v/v) at a prescribed flow rate of 10 ml per minute per channel and a stock solution of cyclohexanol 8 (8.0 g, 8 mmol) in acetonitrile (100 ml) was passed through the microreactor at a rate of 1.25 ml per hour per channel. After passage of all reagents through the microreactor, the product mixture was added to dilute aqueous sodium bicarbonate solution (300 ml). Extraction into dichloromethane, drying ($MgSO_4$) and evaporation of the solvent under reduced pressure gave an oil that contained cyclohexanone 9 (74%, conv. 84%). Identification of cyclohexanone 9 was achieved by comparison of spectra with those of an authentic sample.

EXAMPLE 5

Oxidation of Cyclohexanone 9

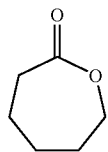
10

By a procedure similar to that described in Example 1, fluorine in nitrogen (10% v/v) at a prescribed flow rate of 10 ml per minute per channel and a stock solution of cyclohexanone 9 (23.5 g, 0.24 mol) in formic acid (285 ml) and water (15 ml) was passed through the microreactor at a rate of 2.5 ml per hour per channel. After passage of all reagents through the microreactor, the product mixture was added to dilute aqueous sodium bicarbonate solution (300 ml). Extraction into dichloromethane, drying ($MgSO_4$) and evaporation of the solvent under reduced pressure gave an oil that contained 6-hexanolactone 10 (53%, conv. 87%); identification of 6-hexanolactone 10 was achieved by comparison of spectra with those of authentic samples.

EXAMPLE 6

Perfluorination of 2,5-bis(1,1,2,3,3,3-hexafluoropropyl)tetrahydrofuran 11

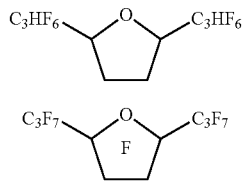

By a procedure similar to that described in Example 1, fluorine in nitrogen (50% v/v) at a prescribed flow rate of 20 ml per minute per channel and 2,5-bis(1,1,2,3,3,3-hexafluoropropyl)tetrahydrofuran 11 (109.8 g, 32 mmol) was passed through a 9-channel microreactor, that was maintained at a temperature of 0° C. by external cooling, at a rate of 0.5 ml per hour per channel. After passage of all reagents through this first microreactor, all reagents were passed through a second 9-channel microreactor, which was attached to the first microreactor in series, and heated to a temperature of 280° C. by external heating. After passing all reagents through the series of two microreactors, excess fluorine gas and volatile waste products were passed through a scrubber filled with soda lime. Liquid products were collected in an FEP tube which was cooled externally and, after all of the starting material had been passed through the microreactors, sodium fluoride was added to the liquid product. Distillation of the organic material from the sodium fluoride gave perfluoro-3,5-bispropyl-tetrahydrofuran 12 (152 g, 52%) as a colourless liquid; spectral data were in agreement with literature values.

EXAMPLE 7

Perfluorination of bis-(1,1,2,3,3,3-hexafluoropropyl)cyclohexane 13

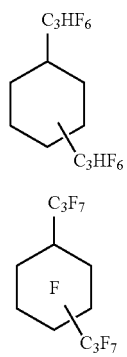

By a procedure similar to that described in Example 1, fluorine in nitrogen (50% v/v) at a prescribed flow rate of 20 ml per minute per channel and bis-(1,1,2,3,3,3-hexafluoropropyl)cyclohexane 13 (50 g, 0.13 mol) as a mixture of isomers was passed through a 9-channel microreactor, that was maintained at a temperature of 0° C. by external cooling, at a rate of 0.5 ml per hour per channel. After passage of all reagents through the first microreactor, all reagents were passed through a second 9-channel microreactor, which was attached to the first microreactor in series, and heated to a temperature of 75° C. by external heating. After passage of all reagents through this second microreactor, all reagents were passed through a third 9-channel microreactor, which was attached to the first and second microreactors in series, and heated to a temperature of 275° C. by external heating. After passing all reagents through the series of three microreactors, excess fluorine gas and volatile waste products were passed through a scrubber filled with soda lime. Liquid products were collected in an FEP tube which was cooled externally and, after all of the starting material had been passed through the microreactors, sodium fluoride was added to the liquid product. Distillation of the organic material from the sodium fluoride gave perfluoro-(bis-propyl-cyclohexane) 14 (29 g, 38%) as a mixture of isomers and as a colourless liquid; spectral data was in agreement with literature values.

EXAMPLE 8

Direct Fluorination of 2,2-dimethyl-1,3-dioxane-4,6-dione 15

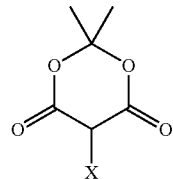

15, X = H
16, X = F

By a procedure similar to that described in Example 1, fluorine in nitrogen (10% v/v) at a prescribed flow rate of 10 ml per minute per channel and a stock solution of 2,2-dimethyl-1,3-dioxane-4,6-dione 15 (30.0 g, mmol) in acetonitrile (175 ml) was passed through the 9-channel microreactor at a rate of 0.5 ml per hour per channel. After passage of all reagents through the microreactor, work up as described in Example 1, gave a crude oil (12.4 g) that contained 2,2-dimethyl-1,3-dioxane-5-fluoro-4,6-dione 16 (15%). Identification of 2,2-dimethyl-1,3-dioxane-5-fluoro-4,6-dione 16 was achieved by comparison of spectra with those of an authentic sample.

The invention claimed is:

1. A reactor for carrying out a plurality of simultaneous reactions between at least first and second fluids, the reactor comprising a reactor plate having therein a plurality of flow paths in each of which the at least first and second fluids may react and a reservoir plate provided in plane parallel relationship to the reactor plate, the reservoir plate having therein reservoirs, the reservoirs including a first reservoir common to the plurality of the flow path for supply of the first fluid hereto and at least one second reservoir common to the plurality of flow paths for supply of the second fluid thereto, the reservoirs including at least a first reservoir for the first fluid and a second reservoir for the second fluid, wherein the reservoirs extend in a direction which crosses the plurality of flow paths, such that each of the reservoirs is in fluid communication with the plurality of flow paths in the reactor plate, where each of the plurality of reactions occurs within each of the plurality of flow paths.

2. A reactor according to claim 1 wherein each of the plurality of reactions involves same reactants.

3. A reactor according to claim 1 wherein the flow paths in the reactor plate are formed in a surface of the reactor plate.

4. A reactor according to claim 3 wherein the flow paths are formed as grooves or cuts in the surface of the reactor plate.

5. A reactor for carrying out a reaction between at least first and second fluids, the reactor comprising a reactor plate having therein a plurality of flow paths in which the at least first and second fluids may react and a reservoir plate provided in plane parallel relationship to the reactor plate, the reservoir plate having therein reservoirs, the reservoirs including at least a first reservoir for the first fluid and a second reservoir for the second fluid, wherein the reservoirs extend in a direction which crosses the plurality of flow paths, such that each of the reservoirs is in fluid communication with the plurality of flow paths in the reactor plate, wherein the flow paths communicate with one or both said reservoirs directly by channels provided between that or those reservoirs and the flow paths.

6. A method for carrying out a plurality of simultaneous reactions between at least first and second fluids, the method comprising:

providing a reactor for carrying out a reaction between at least first and second fluids, the reactor comprising a reactor plate having therein a plurality of flow paths in which the at least first and second fluids may react and a reservoir plate provided in plane parallel relationship to the reactor plate, the reservoir plate having therein reservoirs, the reservoirs including at least a first reservoir common to the plurality of flow paths for providing the first fluid thereto and a second reservoir common to the plurality of flow paths for providing the second fluid thereto, wherein the reservoirs extend in a direction which crosses the plurality of flow paths, such that each of the reservoirs is in fluid communication with the plurality of flow paths in the reactor plate being in fluid communication with the at least first and second reservoirs;

causing a first fluid to occupy the first reservoir and a second fluid to occupy the second reservoir; and carrying out the plurality of reactions by reacting the first and second fluids in the plurality of flow paths in the reactor plate, where each of the plurality of reactions occurs within each of the plurality of flow paths.

7. A method according to claim 6 wherein the reactor plate is oriented vertically.

8. A method according to claim 7 wherein the flow paths are oriented vertically.

9. A method according to claim 6 wherein flow in the reactor is controlled so that the first liquid and the second liquid travel along said flow paths in "pipe flow".

10. A method of making a reactor, wherein the method comprises:

providing a reservoir plate;

providing a reactor plate;

forming a plurality of flow paths in the reactor plate;

providing one or more reservoirs, the one or more reservoirs crossing the flow paths; and forming communication channels between the one or more reservoirs and the flow paths.

11. A reactor for carrying out a reaction between at least first and second fluids, the reactor comprising a reactor plate having therein a plurality of flow paths in which the at least first and second fluids may react and a reservoir plate provided in plane parallel relationship to the reactor plate, the reservoir plate having therein reservoirs, the reservoirs including at least a first reservoir for the first fluid and a second reservoir for the second fluid, wherein the reservoirs extend in a direction which crosses the plurality of flow paths, such that each of the reservoirs is in fluid communication with the plurality of flow paths in the reactor plate, wherein a channel is provided between each of the reservoirs and the plurality of flow paths.

12. A reactor for carrying out a reaction between at least first and second fluids, the reactor comprising a reactor plate having therein a plurality of flow paths in which the at least first and second fluids may react and a reservoir plate provided in plane parallel relationship to the reactor plate, the reservoir plate having therein reservoirs, the reservoirs including at least a first reservoir for the first fluid and a second reservoir for the second fluid, wherein the reservoirs extend in a direction which crosses the plurality of flow paths, such that each of the reservoirs is in fluid communication with the plurality of flow paths in the reactor plate, wherein the flow paths are formed as slits or channels extending through the whole thickness of the reactor plate.

13. A reactor according to claims 1, 12, 5, or 11 wherein the reservoir plate further comprises a product reservoir, the outlets of the flow paths being in fluid communication with said product reservoir.

14. A reactor according to claims 1, 12, or 11 and comprising at least one third reservoir for a respective third fluid in fluid communication with said flow paths downstream of the first and second reservoirs.

15. A reactor according to claims 1, 12, 5, or 11 and provided with means for controlling the temperature of at least one of the reservoir or at least one of the flow paths.

16. A reactor according to claim 15 wherein said controlling means comprise channels for cooling or heating fluid formed within the reservoir plate.

17. A reactor according to claims 1, 12, 5, or 11 provided with means for controlling the pressure in and/or pressure gradient along, said flow paths.

18. A system of reactors comprising a plurality of reactors, wherein each of the plurality of reactors is adapted for carrying out a plurality of reaction between at least first and second fluids, the each of the plurality of reactors comprising a reactor plate having therein a plurality of flow paths in which the at least first and second fluids may react and a reservoir plate provided in plane parallel relationship to the reactor plate, the reservoir plate having therein reservoirs, the reservoirs including at least a first reservoir common to the plurality of flow paths for providing the first fluid thereto and a second reservoir common to the plurality of flow paths for providing the second fluid thereto, wherein the reservoirs extend in a direction which crosses the plurality of flow paths, such that each of the reservoirs is in fluid communication with the plurality of flow paths in the reactor plate; wherein each of the plurality of reaction occurs within each of the plurality of flow paths being in fluid communication with the at least first and second reservoirs.

19. A reactor according to claims 1, 12, 5, or 11 wherein the plurality of flow paths communicate with each of the reservoirs directly.

20. A reactor according to claims 5 or 11 wherein the channel is inset from sides of the reactor plate parallel to a flow path direction.

21. A reactor according to claims 5 or 11 wherein the channel extends from the surface of the reservoir plate that contacts the reactor plate to a location on a reservoir that is uppermost when in use.

22. A reactor according to claims 1, 12, 5, or 11 wherein at least one of the reservoirs is in the form of a bore.

23. A method according to claim 18 wherein at least one set of like reservoirs of said plurality of parallel reactors are fed with a said fluid from a single source.

24. The system of claim 18 wherein the plurality of reactors is coupled in series.

25. The system of claim 18 wherein the plurality of reactors is coupled in parallel.

26. A system comprising a reactors of claims 12, 5, or 11 wherein a plurality of reactors are used simultaneously.

27. A system comprising a reactors of claims 12, 5, or 11 wherein the flowpaths of a plurality of reactors are coupled in series.

28. A system comprising a reactors of claims 12, 5, or 11 wherein the flowpaths of a plurality of reactors are used in parallel.

29. The system of claim 1 wherein each of the plurality of the reactions occurs within each of the plurality of flow paths.

30. A reactor for carrying out a plurality of simultaneous reactions between at least first and second fluids, the reactor comprising a reactor plate having therein a plurality of flow paths in each of which the at least first and second fluids may react and a reservoir plate provided in plane parallel relationship to the reactor plate, the reservoir plate having at least one first reservoir common to the plurality of flow paths for supply of the first fluid thereto and at least one second reservoir common to the plurality of flow paths for supply of the second fluid thereto, wherein each of the reservoirs supplies the fluid to the plurality of flow paths in the reactor plate via a fluid communication means which extends in a direction which crosses the plurality of flow paths.

31. The reactor of claim 30 wherein the fluid communication means is common to the plurality of flow paths.

\* \* \* \* \*